(12) United States Patent
Faizan et al.

(10) Patent No.: US 11,414,825 B2
(45) Date of Patent: Aug. 16, 2022

(54) APPARATUS AND METHOD TO CLEAN GARBAGE FROM WATER BODIES

(71) Applicant: Mirza Faizan, Irving, TX (US)

(72) Inventors: Mirza Faizan, Irving, TX (US); Yumna Syeda Ali Shah, Murphy, TX (US); Nimra Syeda Ali Shah, Murphy, TX (US); Bilal Syed Ali Shah, Murphy, TX (US)

( * ) Notice: Subject to any disclaimer, the term of this patent is extended or adjusted under 35 U.S.C. 154(b) by 0 days.

(21) Appl. No.: 17/184,998

(22) Filed: Feb. 25, 2021

(65) Prior Publication Data

US 2021/0269998 A1 Sep. 2, 2021

Related U.S. Application Data

(60) Provisional application No. 62/982,736, filed on Feb. 27, 2020.

(51) Int. Cl.
*E02B 15/10* (2006.01)
*E02B 15/04* (2006.01)

(52) U.S. Cl.
CPC .......... *E02B 15/106* (2013.01); *E02B 15/048* (2013.01); *E02B 15/101* (2013.01)

(58) Field of Classification Search
CPC ...... E02B 15/046; E02B 15/048; E02B 15/10; E02B 15/101; E02B 15/106; B63B 35/32
USPC ... 210/170.05, 170.09, 170.11, 242.1, 242.4, 210/747.6, 776
See application file for complete search history.

(56) References Cited

U.S. PATENT DOCUMENTS

| | | | | |
|---|---|---|---|---|
| 3,268,081 A * | 8/1966 | Menkee | ................ | E02B 15/046 210/242.1 |
| 4,746,424 A * | 5/1988 | Drew | .................... | E04H 4/1263 210/242.1 |
| 4,882,073 A * | 11/1989 | Griffith | ................... | E02B 15/00 210/242.1 |
| 5,106,492 A * | 4/1992 | Distinti | ................. | E04H 4/1263 210/242.1 |
| 5,207,901 A * | 5/1993 | Ravagnan | ............. | E02B 15/048 210/242.1 |
| 6,432,304 B1 * | 8/2002 | Nguyen | ................... | B63B 13/02 210/242.1 |
| 10,689,821 B1 * | 6/2020 | Whittington | .......... | E02B 15/048 |
| 2016/0185618 A1 * | 6/2016 | De Luca | ................ | E02B 15/10 210/170.05 |
| 2020/0011020 A1 * | 1/2020 | Ceglinski | .............. | E02B 15/106 |

FOREIGN PATENT DOCUMENTS

WO WO 2017/139855 * 8/2017

* cited by examiner

*Primary Examiner* — Christopher Upton

(57) ABSTRACT

The apparatus for removal of garbage from water comprises a garbage collecting system in a boat with at least one inlet to allow the liquid to flow into the garbage collecting system, a sump pump for pulling liquid into and through the garbage collecting system, and to an outlet of the system, and a collecting system to collect the garbage, wherein the sump pump pumps at such a speed to maintain the highest point on the bottom edge of the inlet at a level below the water line outside the body, and to maintain the water level within the body slightly below that of the water outside the body.

7 Claims, 2 Drawing Sheets

APPARATUS AND METHOD TO CLEAN GARBAGE FROM WATER BODIES

TECHNICAL FIELD

The present invention relates to a cleaning apparatus, more particularly to the cleaning of water bodies like ocean, sea, river, lake, ship docking area, anchorage, dockyard, harbor marina from unnatural garbage and other pollution or contamination.

BACKGROUND OF THE INVENTION

The 'Great Pacific Garbage Patch' is one of the gyres that has grown to more than 600,000 square miles. It includes around 1.8 trillion pieces of trash. The North Atlantic Gyre, the South Atlantic Gyre, the North Pacific Gyre, the South Pacific Gyre, and the Indian Ocean Gyre are a few other big garbage patched landfills.

The second problem is the oil-spilling polluting the surface of the water, which kills thousands of birds, sea turtles, and marine mammals every year. Along with several fatalities, there are a number of adverse effects on the larva or eggs, and animal bodies, which can have a damaging impact on upcoming generations.

Finally, 90% of illegal plastic dump ends-up in the ocean. The smallest microplastic particles are capable of entering the bloodstream, lymphatic system and may even reach the liver. Research shows the injection of microplastic to hamsters end up in blood clots. It may seem that this issue may not be that important, but this could harm humans and other animals in the long term. One would be indirectly eating plastic and oil through edible seafood.

There have been previous attempts to solve the above-mentioned problems, none of them provide a solution to all scenarios. In 2013, a passive ocean cleaning system using the circulating ocean currents started "The Ocean Clean-up Project." In 2015, two Australian avid surfers started the project by creating a trash bin for the sea. Using a pump, near the port, marinas, and yacht clubs, this device pulls rubbish into the bin like a trash can.

Conventionally, Some special-purpose anti-pollution vessels have also appeared at present, such as Chinese patent literature CN201980388U disclosed "water rubbish clean-up vessel", wherein the system describes an adjustable rod, fixed link, and iron cage, the iron cage is fenestral fabric, adjustable rod and fixed link are hinged, are fixed with the iron cage at the fixed link and adjustable rod, and cleaning mechanism is fixed in the two sides of tail of hull by hook, wherein the cleaning ship adopts iron cage to collect rubbish, fill unload and transport behind the rubbish all inconvenient.

Further CN102020004A also discloses a kind of water rubbish clean-up vessel, and the hull of this cleaning ship adopts a catamaran design, is made of detecting navigation system, collection system, refuse disposal system, rubbish uninstalling system, and propulsion system; Detect the zone that the water surface has rubbish by the detecting navigation system, and then autonomous navigation carries out work and realize unattended, although this cleaning ship degree of automation is high, cleaning efficiency is good, complex structure, and the cost is high.

All of these conventional methods/systems, and some other methods/systems presently known in the art have had some flaws in design or mechanism and lacks precision. Most of the existing devices are too expensive and time consuming to be practical for most users. Some shortfalls of the existing method/system or a computer program product include slow and ineffective cleaning. In light of this, there is a need for a method/system that overcomes these constraints.

In the light of these facts, it is of great advantage to the safety of the ocean that there is a system that addresses all three types of water-body pollutants that are large trash, microplastic. There is a need for a system that is designed to clean the ocean rapidly and effectively.

Further, there is also a need for mobility of the device to proceed to different parts of the ocean or any other water bodies to clean the garbage from the water and to make safety decisions without human intervention at all.

None of the above inventions and patents, taken either singly or in combination, is seen to describe the present invention as claimed. Thus, a garbage cleaning System from the ocean that solving the aforementioned problems is desired.

Features and advantages of the invention will be set forth in the description that follows, and in part will be apparent from the description, or may be learned by practice of the invention. The advantages of the invention will be realized and attained by the structure particularly pointed out in the written description and claim hereof as well as the appended drawings.

It is to be understood that both the foregoing general description and the following detailed description are exemplary and explanatory and are intended to provide further explanation of the invention as claimed.

The present invention addresses the issues discussed above.

SUMMARY OF THE INVENTION

It is an advantage of the present invention to provide an apparatus that is capable of efficiently and rapidly removing garbage from the water, and storing, the most common large and small floating garbage It is another advantage of the present invention to provide an apparatus that can attach to an existing floating platform or boat.

The objective of the present invention is to clean the multiple kinds of garbage which are deficiencies of the prior art, to provide a garbage-free ocean, sea, river, lake, and another natural body of water. The present invention is designed to clean large water bodies to help preserve natural habitats and water quality.

In an exemplary embodiment, the apparatus for removal of garbage from water comprises a body with at least one inlet to allow the liquid to flow into the body, a water pump for pulling liquid into and through the body to an outlet, and a filter to catch and collect the garbage, wherein the garbage cleaning system includes a three-stage filtration system using a coarse filter, a fine filter, and an oil-absorbing filter. The first coarse filter from which the water passes through which all large pieces of garbage such as bottles, cans, plastic bags are removed. The second fine filter that filters out the micro-plastics and other small, granular items, and the third filter is oil-absorbing, wherein the oil filter is used to absorb the oil that spills or in the presence of light/heavy oil or pollutants of similar characteristics, and after that, the system restores the water to its natural form without contaminants.

The advantage of this invention is that it filters out multiple types of water contaminators such as large trash, microplastic, and oil. Moreover, it will get filtered in different sections so that it can be decomposed or disposed of accordingly. The system can be adapted to any environment to clean the water.

The object of the present invention is to provide a garbage cleaning system, wherein the floating body or boat is generally rectangular and may be varied in size as needed, depending upon the area of the body of water and the amount of pollution. The top of the boat is openable for removing the collected garbage from the water. In one embodiment, a basket is closely fitted within the interior walls of the boat.

According to another object of the invention, the system has a three-stage filtration system consisting of a coarse filter, fine filter, and oil filter to remove contaminants such as oil for the comprehensive cleaning of the water from the ocean. Further, the system includes a sump pump attached to the boat to inflow the ocean water to the filter and also helps to force the filtered water out from the filter. Further, the system includes a Monitoring and Alerting Unit to alert the concerned authority when the system needs to clean up.

According to the present invention, the garbage cleaning system includes a detection system, wherein the detection system includes the monitoring camera, a sensor, a boat control box including (image processing and signal analysis control equipment). Wherein cameras and sensors are installed on both sides of the boat, wherein the cameras, the sensors, the control box connected to the communication.

There is a need for a garbage cleaning system, wherein the system has a higher capacity of cleaning, low maintenance, industrial strength, high flow rate, sensors to detect and notify clogging issue, aqua-dynamic design, acceptable to waves, sensor program, motor-system, sump-pump, good flow rate, pulls trash in a close-proximity, safe for animals, and cost-effective.

According to the present invention, the inlet should be below the water level to allow the system to collect the garbage and removal will occur.

Other objects, advantages, and features of this invention will become more apparent from the following description.

The details of one or more implementations are set forth in the accompanying description below. Other aspects, features, and advantages of the subject matter disclosed herein will be apparent from the description and the claims.

Drawings - Reference Numerals

10 - Filter Carrying Boat
11 - Propeller and Rudder Mechanics
12 - Bottom hemisphere of filter boat
13 - Top hemisphere of filter boat
14 - Filters
15 - Hemisphere connectors
16 - Oil Absorbing material
17 - Fine Filter
18 - Supporting connectors also act as a filter for larger objects
19 - Sump Pump
20 - Outer shell or casing
21 - Flow of water direction

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

The following figure depicts a certain illustrative embodiment of the invention. This depicted embodiment is to be understood as illustrative of the invention and not as limiting in any way.

The origin of the planet earth starts with two-thirds of water impacting life. The oceans bring in half of the oxygen while influencing the climate around us. It provides humans with their food and resources. However, it is not the same ever since humans came polluting the world with plastic, fishing gears, oil pollution, and other harm. With water being one of the most necessary resources that humans need to survive, the present invention is meant to clean this vital resource and preserve it for future generations. With this device, it would be possible to clean each and every garbage gyre and other dirty natural water areas.

Figure 1A:
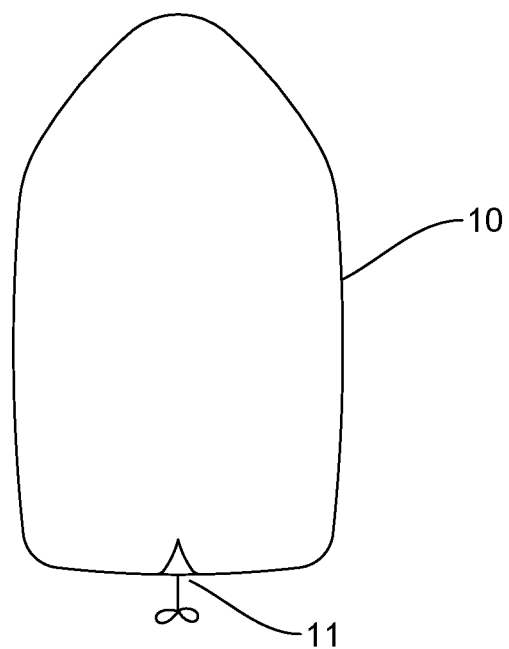

FIG. 1a shows the top view of the garbage cleaning system according to the present invention.

Figure 1B:
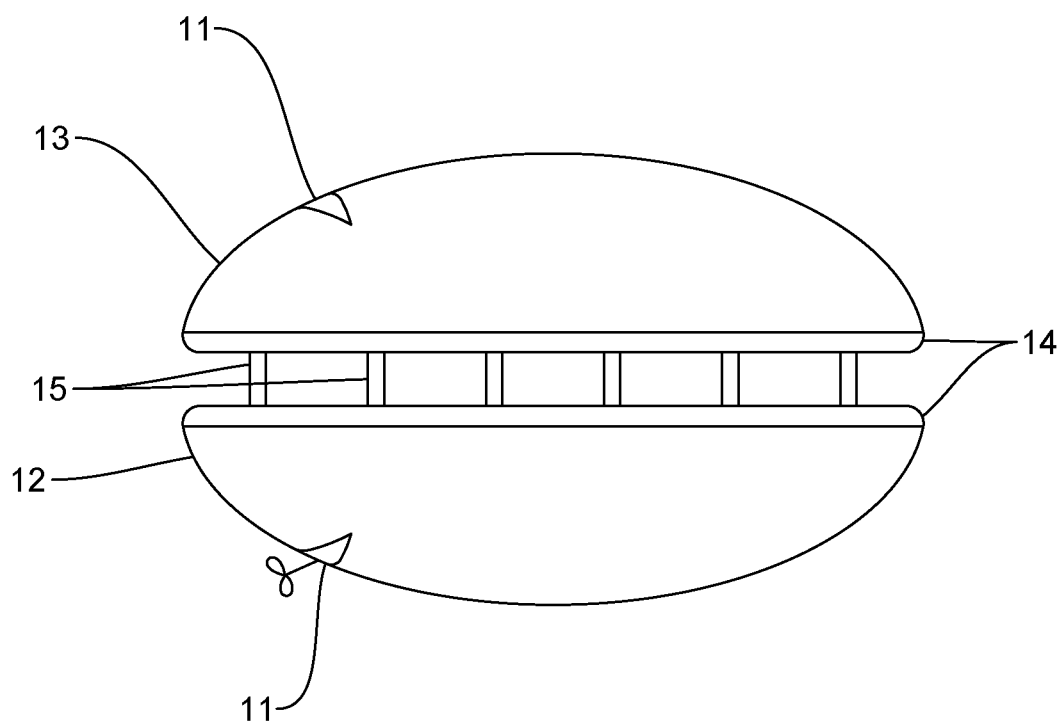

FIG. 1b shows the side view of the garbage cleaning system according to the present invention.

Figure 2:
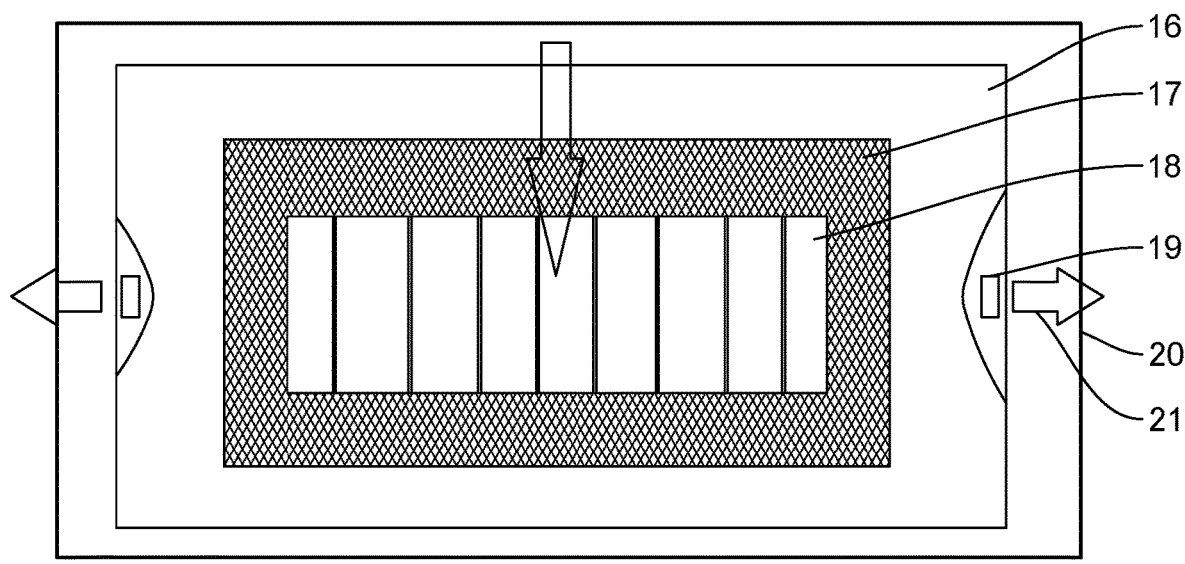

FIG. 2 shows the top cross-sectional view of the garbage cleaning system according to the present invention.

DETAILED DESCRIPTION OF DRAWINGS

FIG. 1a shows a floating body or boat 10, wherein the boat can easily float in the desired direction. The boat includes a propeller/rudder 11, wherein Rudder propellers are ducted or free-running propellers in a fixed or hinged vertical position. They are active control devices with a directed thrust.

FIG. 1b shows the top hemisphere 13 of the floating body or boat 10 is joined together with the plurality of hemisphere connectors 15 to the bottom hemisphere 12 of the floating body as shown in the diagram. In an embodiment, the hemisphere 12 and 13 of the boat is joined together with the plurality of hemisphere connectors, wherein the system uses the water waved buoyantly moving towards it or anything drifting or floating towards it or due to current, ebbing, eddying, maelstrom, torrent, or due to any water turbulence or even any kind of vortex created due to any reason natural or artificial reason and the system also uses the power of the sump-pump, wherein the sump pump is attached to the board and to move the water in and out of the filtration system, wherein the filtration is in between the hemispheres.

As according to the present invention, wherein both side of the boat includes sump-pump 19 with a connector switch which activates the sump-pump only in the bottom hemisphere.

FIG. 2 shows the top cross-sectional view of the garbage cleaning system, wherein both side of the top and bottom hemisphere of the floating body or boat include a single or a plurality of the sump-pump 19 with a connector switch, wherein the switch is used to activate the sump-pump only in the bottom hemisphere. The system includes a three-layer filter system, whereas there is a first coarse filter 18, second Fine Filter 17, and the third Oil Absorbing filter 16.

In operation, the sump pump intakes pull the water from the top and force it out at the bottom. These in-turns keep all/any floating garbage nearby towards the filter unit. In an embodiment, the first filter is used to catch only the larger pollutants such as plastic bag, bottles, diapers, etc. after that the second Fine Filter 17 is used for further cleaning of water, wherein the fine filter consists of the multi-layer filter to filter out very small items that are not captured by the first filter.

After the fine filter, the water flows towards the third Oil Absorbing filter 16, wherein filter 16 is either made by Oleophilic Polyurethane Foams or any other property material that absorbs all types of oil, like petroleum, boat oil, and other unnatural fluids. This third and outermost filter will capture all/any oil spillage.

According to an embodiment of the present invention, the system includes a collecting box 20 to collect the garbage collected by the filter system.

According to an embodiment of the invention, the water boat for the garbage cleaning system work in three modes, detection mode, operation mode, and an idle mode, wherein when the boat is in the detection mode, the system start full speed propeller, speed can be 6 km/h. When the work began, a detection system may be initialized, the garbage collecting system collects the information from the installed sensors, cameras, and the control box to find out garbage in the water. If the garbage area is found, the operating mode is switched to arrive, and the filter system work to filter the garbage from the water with the help of three filtering systems and finally in the idle mode accelerated speed is 4 km/h. The collected garbage may be further analyzed by one or more processors.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be Random Access Memory (RAM) or Read-Only Memory (ROM). The computer system further comprises a storage device, which may be a hard-disk drive or a removable storage drive, such as, a floppy disk drive, optical disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as the reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

To process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, "C," "C++," "Visual C++," Java, and "Visual Basic." Further, the software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various implementations of the systems and techniques described here can be realized in digital electronic circuitry, integrated circuitry, specially designed ASICs (application-specific integrated circuits), computer hardware, firmware, software, and/or combinations thereof. These various implementations can include implementation in one or more computer programs that are executable and/or interpretable on a programmable system including at least one programmable processor, which may be special or general-purpose, coupled to receive data and instructions from and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus, and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A person having ordinary skills in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create other different systems or applications.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Implementations of the embodiments may be made in hardware, firmware, software, or various combinations thereof. The embodiments may also be implemented as instructions stored on a machine-readable medium, which may be read and executed using one or more processing devices. In one implementation, machine-readable media may include various mechanisms for storing and/or transmitting information in a form that can be read by a machine (e.g., a computing device). For example, machine-readable storage media may include read-only memory, random access memory, magnetic disk storage media, optical storage media, flash memory devices, and other media for storing information, and machine-readable transmission media may include forms of propagated signals, including carrier waves, infrared signals, digital signals, and other media for transmitting the information. While firmware, software, routines, or instructions may be described in the above disclosure in terms of specific exemplary aspects and implementations performing certain actions, it will be apparent that such descriptions are merely for the sake of convenience and that such actions result from computing devices, processing devices, processors, controllers, or other devices or machines executing the firmware, software, routines, or instructions.

Further as according to other embodiment of the present invention, If the garbage area is found by the system, then the system adjusts the position of the boat, continues to clean up. If the area is already cleaned, then the system goes beyond the field of view has been monitoring the area and continue to collect images for analysis, for a predefined number of search, if the system check and exceeds a predefined number of searches, the system stop working.

It is therefore submitted that the instant invention has been shown and described in what is considered to be the most practical and preferred embodiments. It is recognized, however, that departures may be made within the scope of the invention and that obvious modification will occur to a person skilled in the art. With respect to the above description then, it is to be realized that the optimum dimensional relationships for the parts of the invention, to include variations in size, materials, shape, form, function, and manner of operation, assembly, and use, are deemed readily apparent and obvious to one skilled in the art, and all equivalent relationships to those illustrated in the drawings and described in the specification are intended to be encompassed by the present invention.

While in the foregoing specification, several embodiments of the invention have been set forth for purposes of making a complete disclosure, it will be apparent to those skilled in the art that numerous changes may be made without departing from the spirit and principles of the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although the present invention has been explained in relation to its some embodiments, it is to be understood that many other possible modifications and variations can be made without departing from the Spirit and Scope of the invention as hereinafter claimed.

What is claimed is:

1. An apparatus for garbage cleaning, wherein the apparatus is attached to a boat for removing garbage from a water surface, said apparatus comprising:
    an openable hemisphere of the boat having a top and a bottom, wherein said top and bottom parts are joined together with the plurality of connectors;
    a plurality of filters;
    a plurality of inlets, wherein each inlet of said plurality of inlets comprises an opening to permit said garbage to pass through said inlet;
    a collecting box to collect garbage filtered through the filters,
    a sump pump attached to the boat for maintaining a substantially constant flow of water into said plurality of inlets and through flow-through openings in collection means; and
    a control module of the garbage cleaning system to work in any of the detection mode, operation mode and an idle mode.

2. The apparatus as claimed in claim 1, wherein said collecting box have dimensions to closely fit within the interior walls of the boat.

3. The apparatus as in claim 2, wherein said collecting box includes means for lifting said collecting box from the boat when the boat is opened.

4. The apparatus as claimed in claim 1, wherein the control module is configured to monitor the real-time status of the garbage collection and one or more areas in said detection mode.

5. The apparatus as claimed in claim 1, wherein the control module is configured to segregate the collected garbage in said detection mode.

6. The apparatus as claimed in claim 1, wherein the control module is configured to analyze the collected garbage in said operation mode.

7. The apparatus as claimed in claim 1, further comprises a three-layer filter system attached with said boat, wherein said filters comprises a first coarse filter, second fine filter, and a third oil absorbing filter.

\* \* \* \* \*